United States Patent [19]

Unser et al.

[11] Patent Number: 4,887,086
[45] Date of Patent: Dec. 12, 1989

[54] COMBINATION SCANNER AND RADAR DETECTOR

[75] Inventors: Bobby Unser, Albuquerque, N. Mex.; Stephen T. Crum, Indianapolis, Ind.

[73] Assignee: Trycomm Technologies, Inc., Noblesville, Ind.

[21] Appl. No.: 78,775

[22] Filed: Jul. 28, 1987

[51] Int. Cl.$^4$ .............................................. G01S 7/40
[52] U.S. Cl. ..................................... 342/20; 455/168; 455/227; 340/902; 340/904
[58] Field of Search ................... 342/20; 455/142, 180, 455/182, 188, 226, 315, 168, 227–229, 7, 1; 340/901–906

[56] References Cited

U.S. PATENT DOCUMENTS

| | | | |
|---|---|---|---|
| 3,257,617 | 6/1966 | Goldmark et al. | 455/142 |
| 3,660,811 | 5/1972 | Vail et al. | 455/1 X |
| 3,665,318 | 5/1972 | Hoffman et al. | 455/158 |
| 3,710,313 | 1/1973 | Kimball et al. | 455/1 X |
| 3,714,585 | 1/1973 | Koch | 455/158 |
| 3,883,803 | 5/1975 | Boone et al. | 324/77 K |
| 3,940,697 | 2/1976 | Morgan | 455/188 X |
| 3,949,300 | 4/1976 | Sadler | 455/1 |
| 3,974,452 | 8/1976 | Cunningham | 455/158 |
| 3,996,521 | 12/1976 | Owens | 455/166 |
| 3,996,522 | 12/1976 | Koch et al. | 455/166 |
| 4,000,468 | 12/1976 | Brown et al. | 455/165 |
| 4,057,760 | 11/1977 | Koch | 455/154 |
| 4,112,377 | 9/1978 | Tanner et al. | 455/142 X |
| 4,157,505 | 6/1979 | Owens | 455/222 |
| 4,157,547 | 6/1979 | Freimark et al. | 455/142 X |
| 4,216,545 | 8/1980 | Flickshu et al. | 455/1 X |
| 4,298,989 | 11/1981 | Someno et al. | 455/180 X |
| 4,317,227 | 2/1982 | Skerlos | 455/180 |
| 4,339,829 | 7/1982 | Dimon | 455/180 X |
| 4,348,771 | 9/1982 | Klank et al. | 455/180 |
| 4,398,304 | 8/1983 | Fathauer | 455/180 X |
| 4,411,021 | 10/1983 | Yoakum | 455/222 |
| 4,435,843 | 3/1984 | Eilers et al. | 455/205 |
| 4,598,422 | 7/1986 | Fellman | 455/182 X |

Primary Examiner—Thomas H. Tarcza
Assistant Examiner—John B. Sotomayor
Attorney, Agent, or Firm—Welsh & Katz, Ltd.

[57] ABSTRACT

A radio receiver for use in a vehicle combines a radar receiver, a receiver for the citizen band, and a scanning receiver for public service bands which are controlled in operation and function by a microprocessor. The public service scanning receiver covers a range of public service bands from 37 MHz to 470 MHz. The receiver for the citizen band covers frequencies from 26 to 28 MHz. The radar receiver covers frequencies of traffic radars located in the X and K bands, from 8 to 24 GHz. In the preferred embodiment, a radar detector responds to radar signals in either the X or K band under control of the microprocessor, and is in a standby mode whether or not the operator is listening to reception on the citizen band or a public service band. A synthesizer either selects a desired channel in the citizen band or else scans a preselected group of public service frequencies that correspond to those assigned to a particular state, country or city. Combined radio front ends are served by the synthesizer that is controlled by the microprocessor. Received signals undergo a dual conversion to produce an IF signal that is either narrowband FM in the case of public service signals or AM in the case of CB. The signal that is selected is controlled by the microprocessor and is coupled to an audio amplifier and speaker to be heard. Under the control of a microprocessor, a detected traffic radar signal will override the signal being heard unless the operator elects otherwise. The use of a common front end for the public service receiver and the citizen band receiver minimizes cost and simplifies control of bands and frequencies by the microprocessor, leading to a portable device that is readily removed from a vehicle to minimize the risk of theft.

15 Claims, 6 Drawing Sheets

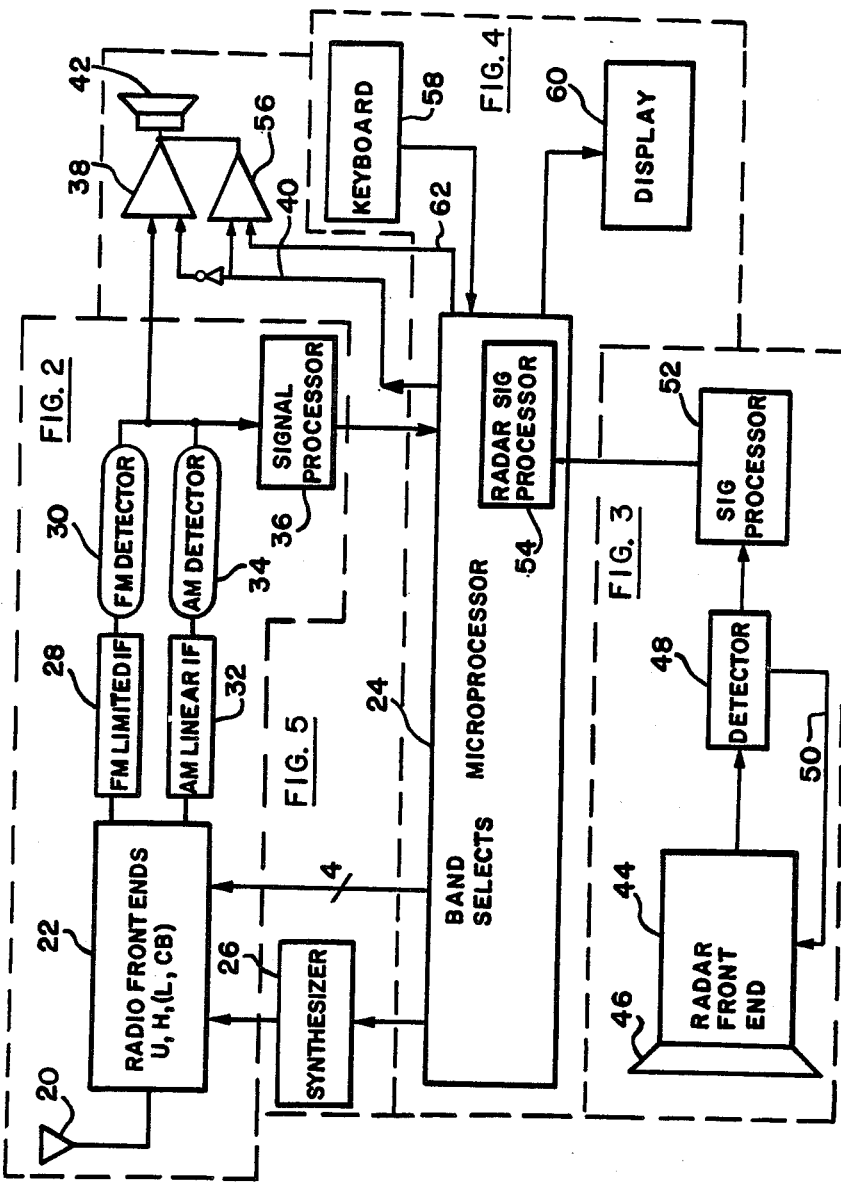

COMBINATION SCANNER AND RADAR DETECTOR

BACKGROUND OF THE INVENTION

This invention relates generally to a radio receiver, and in particular, it relates to a novel combination of a traffic radar receiver, a scanning receiver for the public service radio bands, and a receiver for the citizen band.

The convenience and safety of highway travel is enhanced by the use of a number of items of electronic equipment that are now available. One of these is the traffic radar receiver, which provides an indication of the presence of traffic radar that is in use of the vicinity of the traveler. A second is a scanning receiver for the public service radio bands, which alerts the listener to broadcasts affecting highway conditions and the availability of police, fire, and ambulance units. A third is a receiver for broadcasts on the citizen band (CB). Separate units are available commercially to handle each of these functions. Thus, it is possible to obtain a separate traffic radar receiver for use in a vehicle. It is also possible to obtain a scanning receiver that covers the public service bands and that is adaptable for use in a vehicle. Moreover, it is possible to obtain a receiver for the citizen band that can be used in vehicles. However, the cost of three such individual units becomes considerable, and the amount of space required in a vehicle for all three such units can present storage and handling problems.

In addition, most scanning receivers for public-service bands have a limited number of frequencies that are set to match those in use in a particular area. Frequencies for public-service bands are typically assigned by the Federal Communications Commission for individual states. The traveler who crosses from one state into another thus finds a need to change the frequencies that are scanned. This typically requires maintaining a table of the frequency assignments and manually changing scanned channels for the new state.

An additional problem common to radar receivers, portable scanning receivers for public-sevice bands, and receivers for the citizen band is that such items attract thieves if left in the passenger compartment of a vehicle. One solution to this problem has been to make the items of equipment portable so that they can be removed from the passenger compartment. One such unit is easy to handle, but two or three present complications. Another particular problem is presented if the items of equipment are to be powered from the power supply of the vehicle, as through a cigarette lighter socket. As a result, it is common to use battery-powered radar receivers and to make permanent installations of CB units that combine transmitters and receivers. However, the battery-powered units present the possibility of battery failure at an inopportune time, and the use of separate units for scanning traffic radar, receiving public service bands, and monitoring the citizen band leads to the duplication of components and functions that increase the total cost of such equipment.

SUMMARY OF THE INVENTION

It is an object of the present invention to provide an improved radio receiver for vehicles.

It is a further object of the present invention to provide a combination traffic radar receiver, scanning receiver for public service bands, and receiver for the citizen band in a single unit.

It is another object of the present invention to provide a combination detector for traffic radars, scanning receiver for citizen band and scanner for public-service radio bands which is controlled in function and operation by a microprocessor.

It is a still further object of the present invention to provide a combination traffic radar receiver, scanning receiver for public service radio bands, and receiver for the citizen band that is programmable to contain the frequency spectrum assigned to each of the states.

It is a further object of the present invention to provide on a single chassis a detector for traffic radar, a scanning receivers for active public service bands in a particular area, and a receiver for the citizen band.

Other objects will become apparent in the course of a detailed description of the invention.

A radio receiver for use in a vehicle combines a radar receiver, a receiver for the citizen band, and a scanning receiver for public service bands that is controlled in function and operation by a microprocessor. The public service scanning receiver covers a range of public-service bands from 37 to 512 MHz. The receiver for the citizen band covers frequencies from 26.995 to 27.405 MHz. Traffic radars are operated in the X and K bands from 10.525 to 24.150 GHz. In the preferred embodiment, a radar detector responds to radar signals in either the X band or K band under control of the microprocessor, and is in a standby mode whether or not the operator is listening to reception on the citizen band or a public service band. A synthesizer either selects a desired channel in the citizen band or else scans a preselected group of public-service frequencies that correspond to those assigned to a particular state, city or region. Radio front ends are served by a common synthesizer that is controlled by a microprocessor. Received signals undergo dual conversion to produce an IF signal that is either narrow-band FM in the case of public-service signals or AM in the case of CB. The signal that is selected is controlled by the microprocessor and is coupled to an audio amplifier and speaker to be heard.

Under the control of a microprocessor, a detected traffic radar signal will override the signal being heard unless the operator elects otherwise. The use of a common front end for the public-service receiver and the citizen band receiver minimizes cost and simplifies control of bands and frequencies by the microprocessor, leading to a portable device that is readily removed to minimize the risk of theft.

BRIEF DESCRIPTION OF THE DRAWINGS

FIG. 1 is a system block diagram of the receiver of the present invention;

DETAILED DESCRIPTION OF THE INVENTION

Figure 2A:
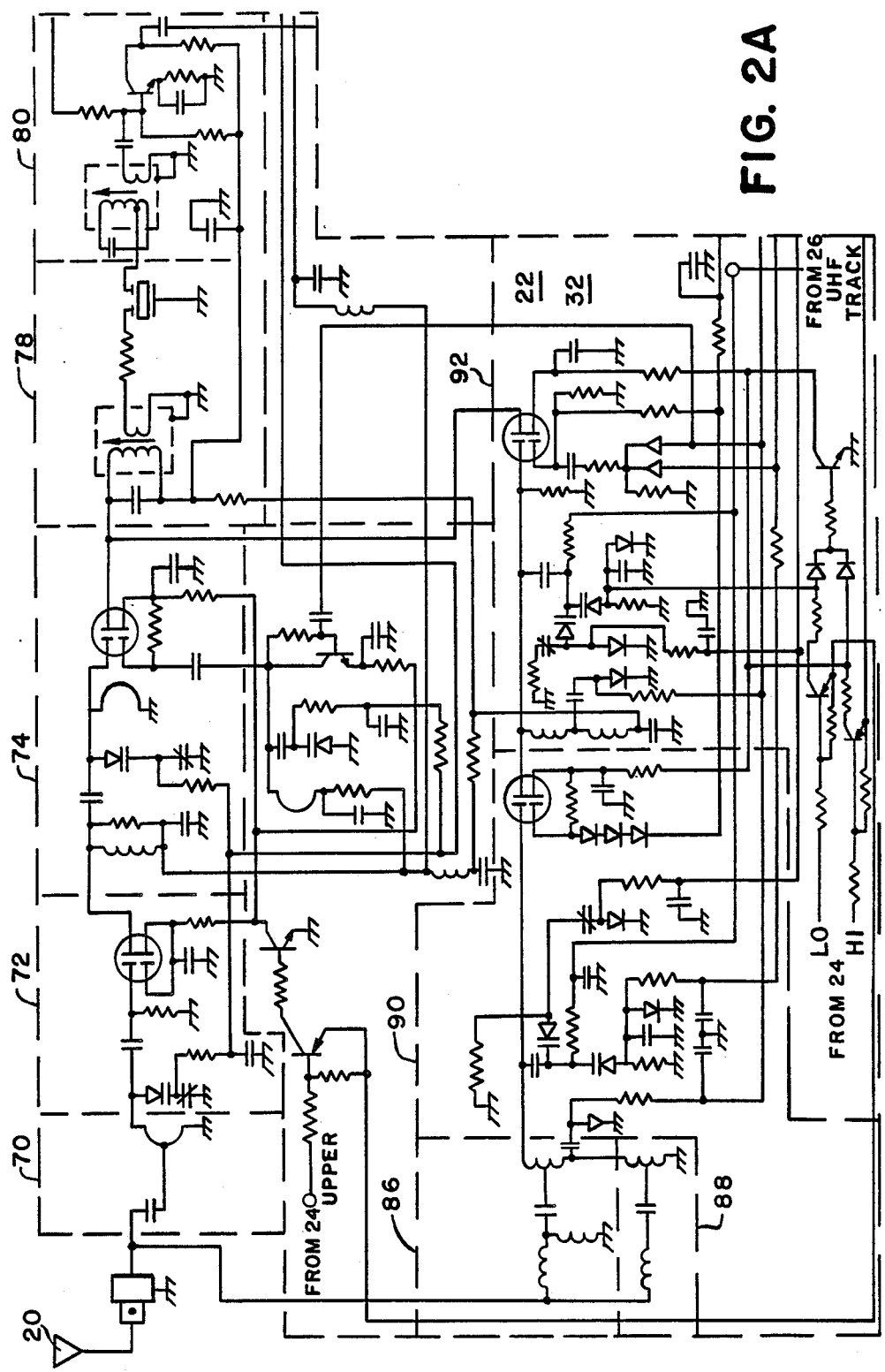
FIGS. 2A and 2B are a detailed circuit diagram of the radio front ends, IFs, and detectors illustrated in FIG. 1.

FIG. 1 is a system block diagram of the circuit of the receiver of the present invention. In FIG. 1, an antenna 20 is connected to radio front ends 22. It is convenient to use a single antenna 20, although it would be equally feasible to use a plurality of antennas since the front ends 22 cover frequencies ranging from 27 MHz through 510 MHz, and may be extended to include public-service frequencies in the 800 MHz band.

The front ends 22 are controlled by a microprocessor 42 which selects the bands that are used and also controls operation of a synthesizer 26. The synthesizer 26 allows for the sweeping of frequencies in any of the public service bands and it may be used to sweep the citizen band, although in the illustrated embodiment of the invention it is used to select individual frequencies in the citizens' band without sweeping.

Outputs from the public-service bands are taken to an FM IF circuit 28, and then detected in an FM detector 30 to produce an audio output. Output from the CB band is amplified in an AM IF circuit 32 and then detected in an AM detector 34 to produce an audio output. The audio outputs from the FM detector 30 and the AM detector 34 are input to a signal processor 36 which supplies an input to the microprocessor 24. The audio signals are also taken to an amplifier 38 which is enabled by a signal on a line 40 from the microprocessor 24. The audio signal from the amplifier 38 drive a speaker 42 where they are made audible to a listener.

A radar front end 44 includes an antenna 46 that is adapted to receive traffic radar signals, which are typically in either the X band or the K band. Signals that are received on the antenna 46 are processed in the radar front end 44 and are coupled to a detector 48. A line 50 indicates feedback control from the detector 48 to the front end 44. Detected signals from the detector 48 are taken to a signal processor 52, and then to the microprocessor 24 where they are further processed in a region denoted as a radar signal processor 54. An output of the radar signal processor 54 is taken to the amplifier 38 over line 40 to disable the amplifier from passing audio signals to the speaker 42. The output enables an amplifier 56, which passes to the speaker 42 an audio signal indicating the detection of a signal from a traffic radar. Operation of the circuit of FIG. 1 is controlled by inputs from a keyboard 58. Outputs are generated under the control of the microprocessor 24 for coupling to a display 60. Details of both the keyboard 58 and the display 60 will be made apparent later in the detailed description.

Figure 2B:
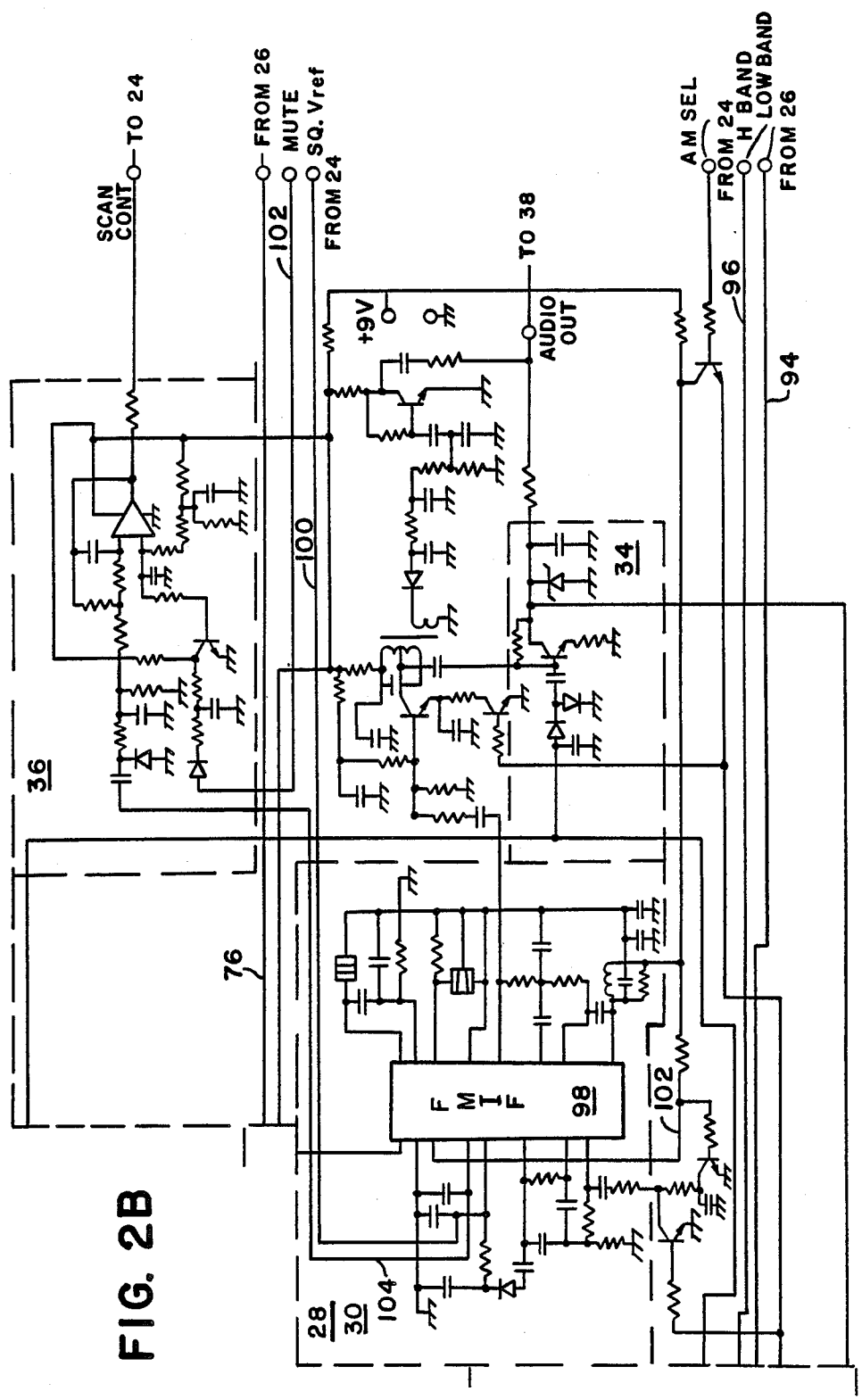

FIG. 2 is a detailed circuit diagram of the radio front ends 22, IFs 28, 30, and detectors 30, 34 of the present invention. In the practice of this invention, it is necessary to receive amplitude-modulated (AM) transmissions in the Citizen Band in the range of 26.995 to 27.405 MHz. and narrow-band frequency-modulated (FM) transmissions in various bands spanning a range of frequencies from 37 MHz. to 510 MHz. These are conveniently built separately. Thus, in FIG. 2, a filter 70 selects UHF frequencies which are amplified in an amplifier 72. A mixer 74 receives a signal on a line 76 to select a desired frequency that is taken to a filter 78, and then to an IF amplifier 80.

Signals from the antenna 20 are also taken to filters 86 and 88. The filter 86 selects high-frequency signals, in the frequency range 450 MHz to 510 MHz, while the filter 88 selects low-frequency signals, from 27 MHz to 174 MHz. The output signals from both filters are amplified in an amplifier 90 and are taken to a mixer 92, which receives either a low-band local-oscillator signal on a line 94 or a high-band local-oscillator signal on a line 96. The output of the mixer 92 is an IF signal that is taken to the filter 78, then to the IF amplifier 80.

The FM output from the IF amplifier 80 is taken to an integrated circuit (IC) 98. This is preferably a chip such as the Motorola MC3357, MC 3359 or TK 10420, each of which includes an oscillator and mixer to effect a second frequency conversion of the IF signal to 455 KHz. The IC 98 responds to a number of control inputs and produces a number of outputs. A line 100 supplies a squelch reference voltage from the microprocessor 24. The voltage is adjustable to set a squelch. A line 102 carries a muting signal from the microprocessor 24 that disables audio signals while channels are being scanned. A scan control signal is produced on a line 104 and is taken through signal processor 36 to microprocessor 24.

Figure 3:
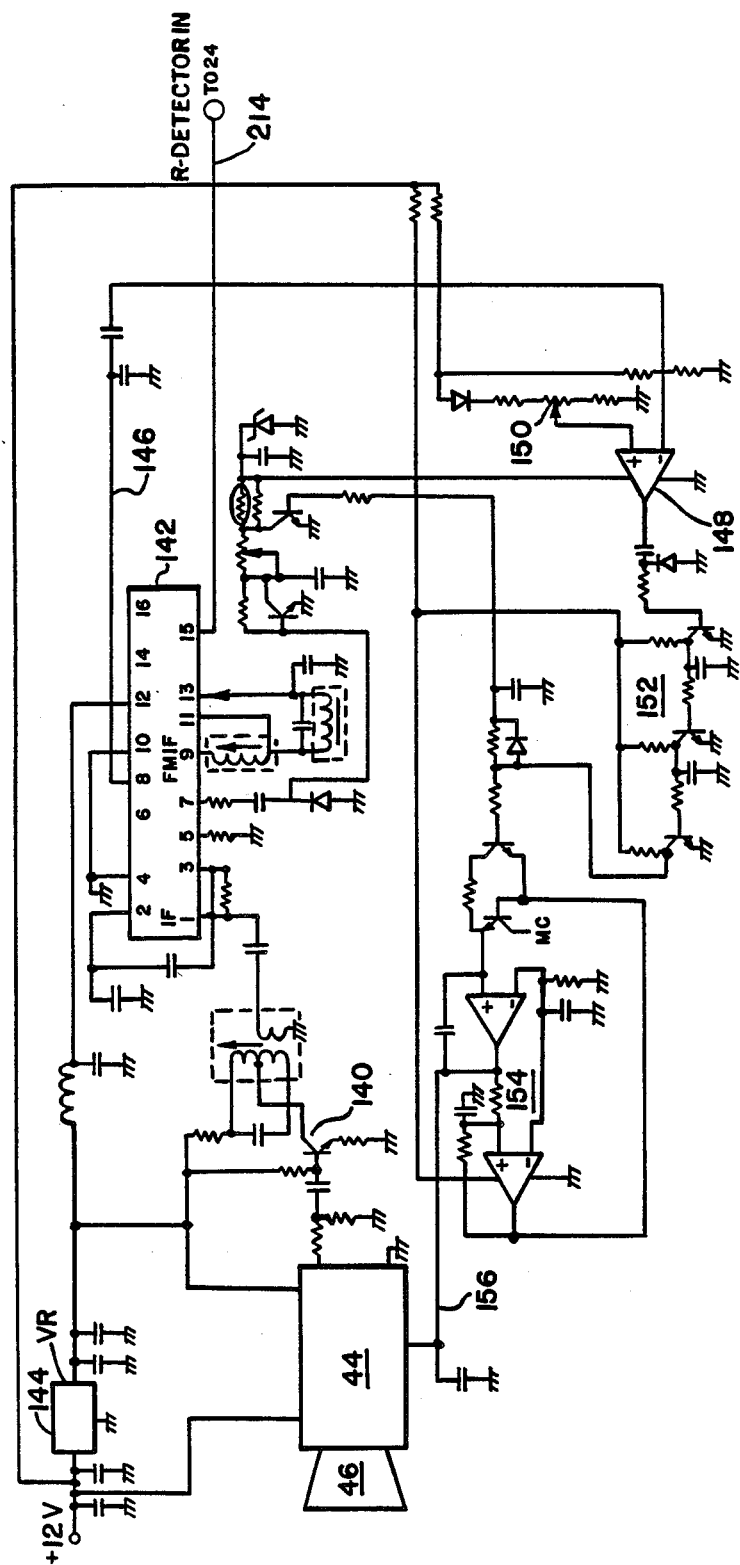
FIG. 3 is a circuit diagram of the radar front end, detector, and signal processor illustrated in FIG. 1.

FIG. 3 is a detailed circuit diagram of the radar front end 44, detector 48, and signal processor 52 of FIG. 1. In FIG. 3, the antenna 46 receives a radar signal that is amplified in the radar front end 44. The signal is amplified further in a transistor amplifier 140, and is then taken to an IC 142, which is an FM IF system such as the Motorola MC 3359 or the Sanyo LA 1140. The IC 142 functions as an IF amplifier and limiter, a quadrature detector, and a preamplifier for an audio signal. The IC 142 receives its operating voltage from a power supply 144 that also supplies power to the rest of the elements in FIG. 3. An AGC feedback loop takes an output on a line 146, which is a signal that is compared in a comparator 148 with a reference voltage selected by a potentiometer 150. The output of the comparator 148 is amplified in an amplifier 152, the output of which is taken to another amplifier 154 and applied as an AFC signal to the radar front end 44 on a line 156. The pin 15 output from the IC 142 is a measure of signal strength that is taken on a line 214 to the microprocessor 24 to indicate reception of a radar signal.

Figure 4:
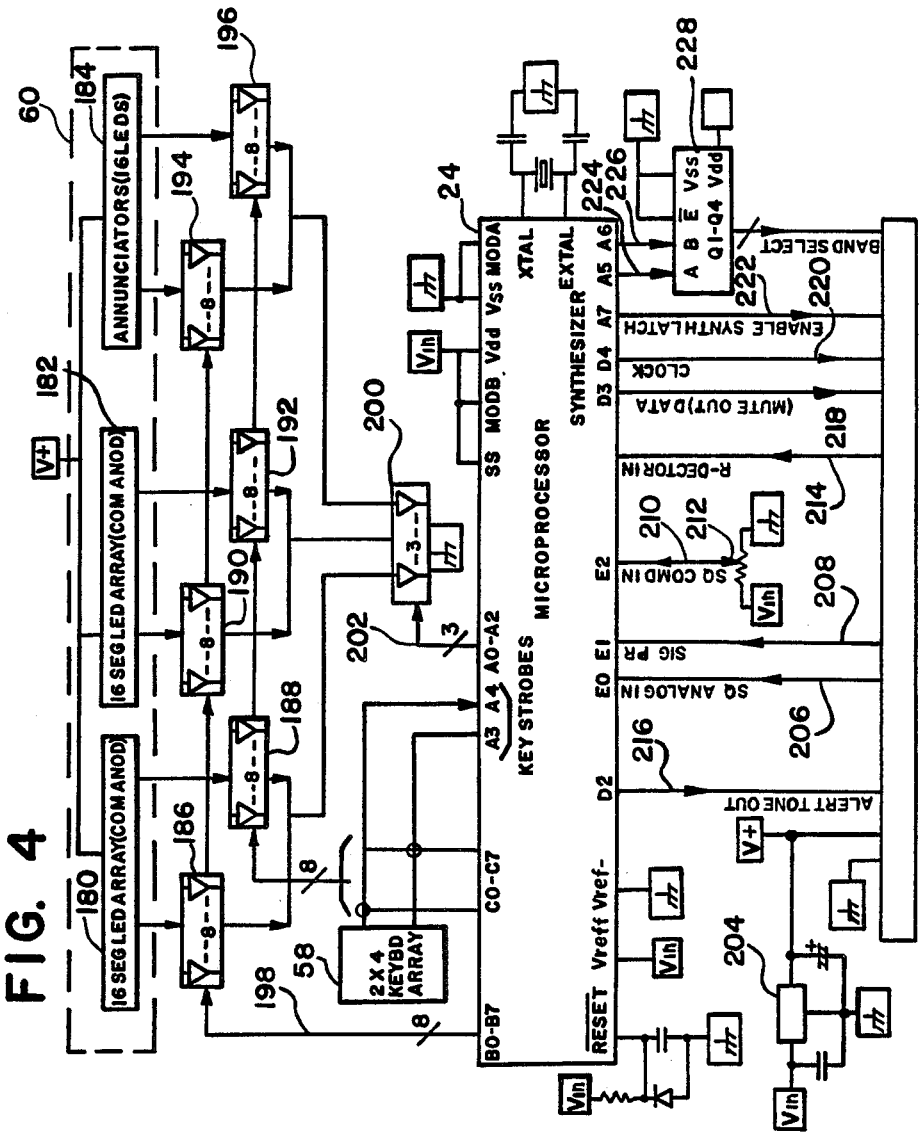
FIG. 4 is a functional block diagram of the microprocessor, keyboard, and display illustrated in FIG. 1.

FIG. 4 is a functional diagram of the microprocessor 24, the keyboard 58, and the display 60 fo FIG. 1. In FIG. 4, in the preferred embodiment of the invention, the microprocessor 24 was selected as a Motorola MC68HC11A8 single-chip microcomputer that includes 8 Kbytes of ROM, 2 Kbytes of EEPROM, and 256 bytes of RAM. An acceptable alternative is the NEC UPD 75P108. In alternate embodiments of the invention, it might be desirable to have ROM, EEPROM, or both in separate chips and is a matter of design choice. The display 60 comprises 16-segment digital display arrays 180 and 182, and an annunciator array 184 of 16 light emitting diodes (LEDs). The arrays 180 and 182 are alphanumeric, to display two-letter state codes when the public service bands are in use and to display channel numbers when in CB mode. The array 184 provides control of LED indicators to mark signal strength and to identify the functions that are selected. Individual segments of the 16 elements in the array 180 are controlled by individual drivers of a pair of eight-element driver arrays 186 and 188. Individual segments in the array 182 are similarly controlled by individual drivers in a pair of eight-element driver arrays 190 and 192. The annunciator LEDs of the array 184 are similarly controlled by driver arrays 194 and 196. Desired segments of the arrays 180, 182 and 184 are selected under the control of the microprocessor 24 by signals from port pins B0–B7, C0–C7 on lines 198 and 199, respectively. Individual arrays are further selected by a driver 200 which is controlled by signals A0–A2 on a line 202 from the microprocessor 24.

The keyboard 58 comprises eight pushbutton switches that control a number of functions through the microprocessor 24. Those functions are identified in Table 1 which is a list on the switches of the keyboard 58 and their functions.

TABLE 1

Switches and Functions of the Keyboard 58

| Switch | Function |
| --- | --- |
| Radar | Turns radar receiver on and off; selects sensitivity of radar receiver. |
| Police | Turns on PSB receiver; selects groups of frequencies within a state at the following levels: state, state and county, state, county and city. |
| CB | Turns CB on and PSB off. |
| Hold | Stops search in PSB mode. |
| Continue | Resumes search in PSB mode. |
| Slew up | PSB: Searches states in inverse alphabetical order. CB: Changes to lower channel. |
| Slew down | PSB: Searches states in alphabetical order. CB: Changes to higher channel. |
| Delete | PSB: Deletes the current frequency from the search list that is stored in EEPROM. |

The display 60 is controlled by the microprocessor 24 to display information that is of interest to a user. In the preferred embodiment of the invention, the display 60 includes two 16-element alphameric LED arrays that are used to identify the state selected in the PSB mode and the channel in CB mode. A linear array of LEDs is used to provide an indication of the strength of a received signal, and individual LEDs are lighted to indicate the function selected (PSB or CB, radar) and, for PSB, whether the selection includes state police, state and county police, or all assigned PSB frequencies in the state. If a received radar signal overrides the CB or PSB reception, the signal strength indicator is switched to radar signal strength.

The microprocessor 24 receives as an input a regulated voltage Vin from a voltage regulator 204 which also supplies regulated voltage to other components of the circuit. The microprocessor 24 receives as analog inputs a squelch signal on a line 206 that is developed in the signal processor 36 of FIG. 2 and an analog signal SIG. PR. on a line 208. A line 210 receives a squelch level voltage, selected as a setting on a potentiometer 212. This is a panel adjustment to allow the operator to select the level of squelch. A line 214 receives the radar signal strength indication from the circuitry of FIG. 3 to indicate that a radar signal has been detected. This signal enable an oscillator in the microprocessor 24 that produces an alert tone on a line 216 to be taken to the line 62 of FIG. 1. Lines 218, 220 and 222 respectively take data, clock pulses and a latch signal to the synthesizer 26 of FIG. 5. Address lines 224 and 226 are taken to a demultiplexer 228 of FIG. 4 which is coupled to radio front ends 22 of FIG. 1 to enable UHF, high band, low band, and AM.

An operating program for the microprocessor 24 is stored internally in ROM which is also loaded with the identifying information for all CB channels and for the PSB channels assigned to each state. The PSB channels are further identified in ROM as being used by state police, county law enforcement officials, or cities. Current settings of the keyboard 58 are stored in the microprocessor 24 in EEPROM, with the exceptions of selections made by the delete button. When a particular PSB channel is deleted by use of the Delete button, the scanning mode ignores it in the search. The channel is restored to the search either by changing the state that is selected for PSB scan or by turning the receiver off and on again. Other selections on the keyboard 58 are stored internally in EEPROM so that the receiver will enable those functions, even after being turned off and on again.

Figure 5:
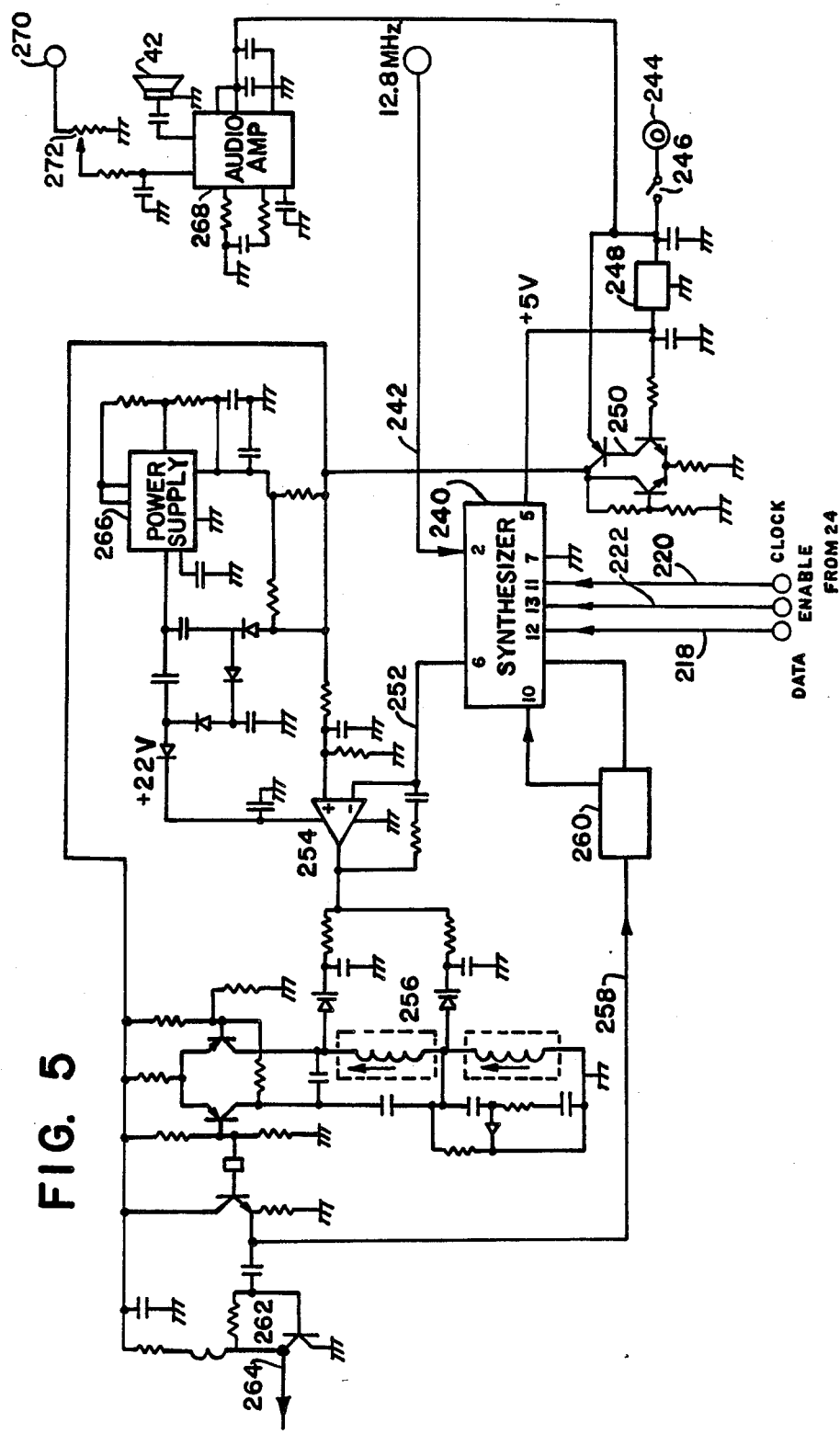
FIG. 5 is a detailed circuit diagram of the synthesizer of FIG. 1.

FIG. 5 is a detailed circuit diagram of the synthesizer 26 of FIG. 1. In FIG. 5 an IC 240 is a frequency synthesizer chip such as the Motorola MC$_{145159}$-1 or MC1451580. An external reference frequency, here 12.8 MHz, is supplied from the microprocessor 24 on a line 242. The lines 218, 220 and 222 of FIG. 4 supply inputs to the IC 240 to couple in data, clock and enable respectively. Power to the IC 240 is supplied to an external terminal 244 which is switched by a switch 246 that is combined with a volume control on the front panel of the receiver of the present invention. A power regulator 248 supplies five volts to the IC 240 and also supplies a reference voltage to a second voltage regulator 250. A synthesized local oscillator signal from the IC 240 is taken on a line 252 to an amplifier 254 which is part of a phase-locked loop. An active filter 256 helps stabilize the phase-locked loop, which is completed through a line 258. The feedback signal is then connected to a dual modulus prescaler 260 and back to IC 240. Amplifier 262 is a buffer for the synthesizer output, which is on a line 264 that is taken to radio front ends 22 of FIG. 1 to supply local-oscillator input signals. The phase-locked loop of FIG. 5 steps in frequency increments that vary with the band selected, and in a number of such increments that corresponds to the preprogrammed schedule of frequencies for the state and mode selected. Scanning continues under the control of the microprocessor 24 as long as no signal is detected in the public service band. Scanning stops for a predetermined period, typically of the order of two seconds, if a signal is detected on a channel that is being scanned. Scanning will then resume unless the operator has elected to stay at the particularly frequency that is the subject of the pause by pressing the hold button. Scanning is then halted until the operator restarts it by pushing the continue button.

The phase-locked loop of the present invention requires voltage of +22 volts for the amplifier 254. This is obtained by the use of a power supply 266. The switch 246 also controls the application of electrical energy to an audio amplifier 268 which drives the speaker 42. Audio input from the FM detector 30 and the AM detector 34 of FIG. 2, or a radar indication from the alert tone generator of the microprocessor 24, is supplied to a terminal 270 of FIG. 5 where it is applied to a volume-control potentiometer 272. The potentiometer 272 is a panel control that is typically combined with the switch 246 to turn the receiver on and off.

Figure 6:
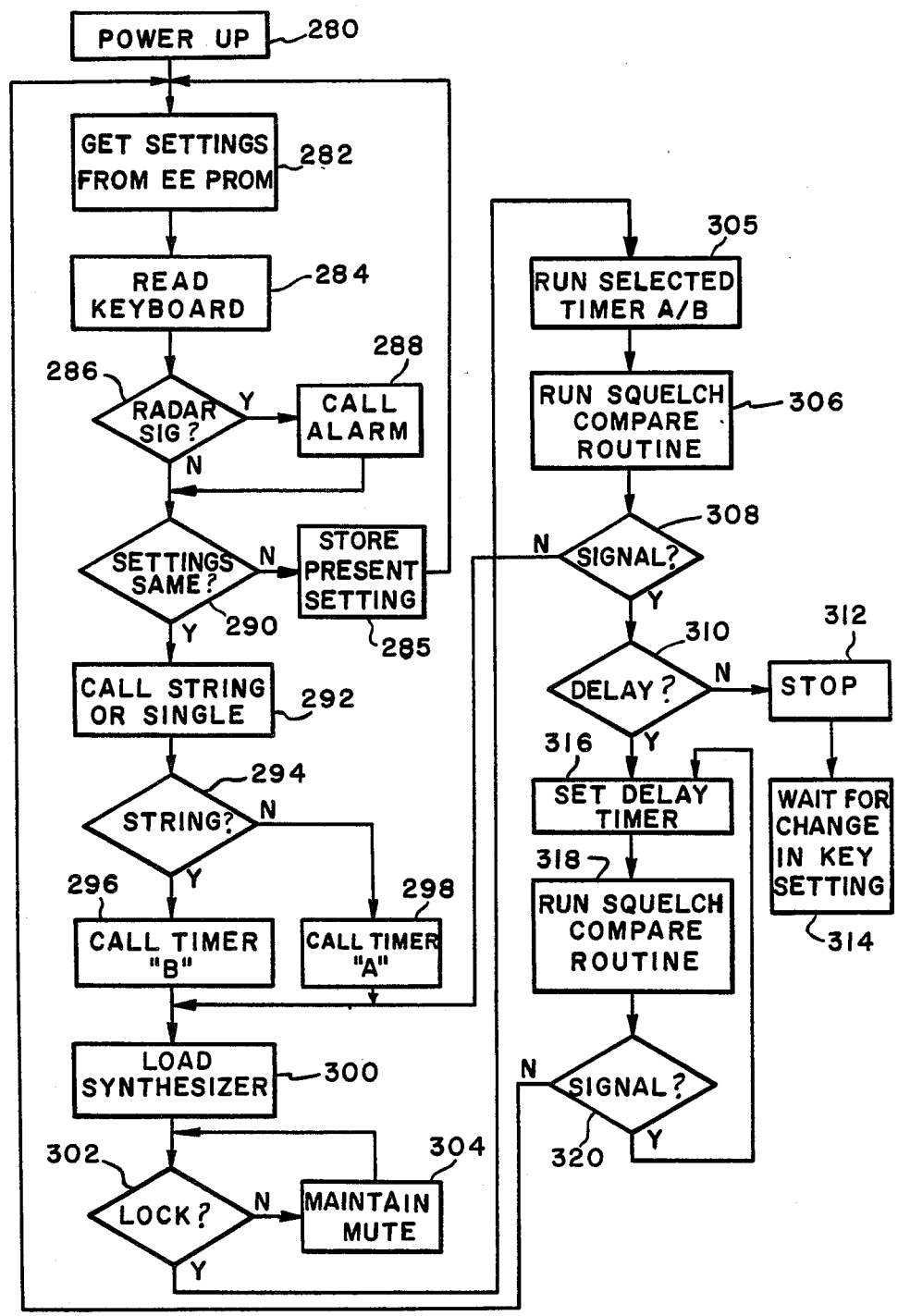
FIG. 6 is a functional flow chart of the software executed by the microprocessor of the present invention.

FIG. 6 is a flow chart of the operation of the software executed by the microprocessor 24 of the present invention. In FIG. 6, a block 280 calls for power-up and resets the microprocessor 24. A block 282 then recalls previous settings from the EEPROM. This includes the mode of operation, either PSB or CB; the selected channels for either; and the level of search, if the previous mode setting was for PSB. A block 284 then calls for reading the keyboard to see which switches are set. A decision block 286 then tests for the presence of a radar signal. If there is a radar signal, a block 288 calls for an alarm subroutine. Whether or not there is a radar signal, control passes to a decision block 290 which tests to see whether keyboard settings are the same as those stored in the EEPROM. If they are not, control returns to the block 282 after storing the present settings in the EEPROM. If the settings are same, control passes to a block 292 which calls a single frequency for CB or a string of frequencies for PSB. If a decision block 294 finds a string, a block 296 calls timer B. If the decision block 294 does not find a string, a block 298 calls timer A. After the appropriate timer is selected, control passes to a block 300 which calls for loading the synthesizer. A decision block 302 then tests to see if the receiver has locked on a frequency. If it has not, a block 304 maintains the receiver muted. If the decision block 302 recognizes a lock, a block 304 calls for the running of the selected timer A or B.

A block 306 then calls for the running of a squelch compare routine, to compare a detected squelch level with the preset value. A decision block 308 then tests to see if an audio signal is detected. If there is no audio, control passes back to the block 300 to reload the synthesizer. If an audio signal is detected, a decision block 310 tests for the setting of a delay. If a decision is made not to delay, a block 312 calls for a stop and a block 314 directs the receiver to wait for a change in a key setting, i.e., for the operator to press continue or change modes. If the decision is to delay in the decision block 310, a block 316 calls for the setting of a delay timer and a block 318 calls for the running of a squelch compare routine, to compare the received squelch signal level with the voltage from the squelch pot. A decision block 320 then tests to see if a signal is detected that is larger than the squelch voltage. If none is detected, control is passed to the block 282 to repeat the cycle since power-up. If a signal is detected, control is returned to the block 316 to repeat that portion of the cycle.

The combination of features of the present invention allows the user to listen to a given channel on the citizen band while the traffic radar receiver is operating and ready to provide the alert signal that overrides the CB reception if a traffic radar signal is detected. In the alternative, the user can scan or lock on a channel or channels in the public-service bands while the radar receiver is operating and ready to receive radar signals, override the PSB reception and provide the alert signal if a traffic radar signal is detected. The user can select the scanning of PSB channels used in the state in which he is located, or he can further select the scanning of state frequencies and county frequencies in that state or to state, and county, and city frequencies in that state. The user thus has a considerable amount of flexibility provided by a receiver that combines all of these features in a single unit which is powered from a single source.

The present invention has been described in terms of the preferred embodiment. The description and detail of elements and components are illustrative and are not be taken as any limitation on the invention.

Instead, the invention should be limited only by the scope of the appended claims.

What is claimed is:

1. A radio receiver comprising in combination in an integral unit: a traffic radar receiver adapted to detect a traffic radar signal such as in the K band or X band, a citizen band receiver, and a receiver for public service bands, the traffic radar receiver adapted to override the citizen band receiver or the receiver for public service bands and provide an alarm when said traffic radar signal is detected.

2. The radio receiver of claim 1 additionally comprising:
a microprocessor that is a part of the integral unit, the microprocessor controlling operation of the traffic radar receiver, the citizen band receiver, and the receiver for public service bands.

3. The radio receiver of claim 2 additionally comprising:
a synthesizer that is controlled by the microprocessor to select frequencies of a local oscillator for either the citizen band receiver or the receiver for the public service bands.

4. The radio receiver of claim 1 wherein the receiver for public service bands is adapted to scan a predetermined set of frequencies.

5. The radio receiver of claim 2 wherein the microprocessor controls a search of frequencies in the receiver for public service bands.

6. The radio receiver of claim 5 wherein the microprocessor controls a synthesizer that applies predetermined frequencies as local oscillator signals to the receiver for public service bands to search a predetermined set of frequencies and to pause at a frequency at which a broadcast is detected.

7. The radio receiver of claim 5 wherein the microprocessor controls a synthesizer that applies first predetermined frequencies as local oscillator signals to the receiver for public service bands to search assigned frequencies for a particular geographic region and service and to pause at a frequency at which a broadcast is detected.

8. The radio receiver of claim 5 wherein the microprocessor controls a synthesizer that applies first predetermined frequencies as local oscillator signals to the receiver for public service bands to search assigned frequencies for each of the states of the United States as stored in read-only memory that is operationally coupled to the microprocessor.

9. A radio receiver comprising in combination in an integral unit:
a scanning receiver for public service bands;
a citizen band receiver;
a traffic radar receiver adapted to receive a traffic radar signal such as in the K band or the X band; and
a microprocessor connected to the scanning receiver, the citizen band receiver, and the traffic radar receiver to control their operation such that the traffic radar receiver can override the scanning receiver or the citizen band receiver to provide an alarm upon detection of said traffic radar signal.

10. The radio receiver of claim 9 wherein the microprocessor comprises in addition a ROM containing information identifying public service frequencies by states.

11. The radio receiver of claim 9 comprising in addition display means for identifying received signal strength.

12. The radio receiver of claim 9 comprising in addition means for deleting a selected frequency when scanning the public service frequencies.

13. The radio receiver of claim 12 comprising in addition means for restoring the deleted frequencies to be scanned when a different state is selected when scanning the public service frequencies.

14. The radio receiver of claim 12 comprising in addition means for restoring the deleted frequencies to be scanned in response to a signal from an operator when scanning the public service frequencies.

15. The radio receiver of claim 9 wherein the microprocessor comprises in addition a ROM containing information identifying public service frequencies by states and further identifying assignment of the public service frequencies to state police, county agencies and cities.

* * * * *